United States Patent
Bowman et al.

(10) Patent No.: US 8,359,145 B2
(45) Date of Patent: Jan. 22, 2013

(54) FLYWHEEL DRIVELINE AND CONTROL ARRANGEMENT

(75) Inventors: Timothy James Bowman, Bexley (GB); Donatus Andreas Josephine Kees, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 367 days.

(21) Appl. No.: 12/638,118

(22) Filed: Dec. 15, 2009

(65) Prior Publication Data
US 2010/0152982 A1  Jun. 17, 2010

(30) Foreign Application Priority Data
Dec. 16, 2008  (GB) .................... 0822861.1

(51) Int. Cl.
*G06F 7/00* (2006.01)
(52) U.S. Cl. ............... 701/53; 180/308; 477/6
(58) Field of Classification Search .......... 701/53; 477/6; 180/165, 305, 308
See application file for complete search history.

(56) References Cited

U.S. PATENT DOCUMENTS

| 7,540,346 | B2 * | 6/2009 | Hu .................. | 180/165 |
| 2002/0177504 | A1 * | 11/2002 | Pels et al. ............ | 477/3 |
| 2003/0098185 | A1 | 5/2003 | Komeda et al. | |
| 2007/0215406 | A1 * | 9/2007 | McDonald et al. ..... | 180/417 |
| 2010/0133903 | A1 * | 6/2010 | Rufer et al. ........... | 307/22 |

FOREIGN PATENT DOCUMENTS

| DE | 3120217 | 9/1982 |
| GB | 2440996 | 2/2008 |
| WO | 2009010819 | 1/2009 |

OTHER PUBLICATIONS

Andrew Barr and Alireza Veshagh, Fuel Economy and Performance Comparison of Alternative Mechanical Hybrid Powertrain Configurations, SAE 2008-01-0083, University of Warwick, 2008 World Congress, Detroit, Michigan, Apr. 14-17, 2008.

* cited by examiner

*Primary Examiner* — Thomas Black
*Assistant Examiner* — Luke Huynh
(74) *Attorney, Agent, or Firm* — David B. Kelley; MacMillan, Sobanski & Todd, LLC

(57) ABSTRACT

In an energy storage and recovery system for a hybrid vehicle 1, the operating ratio range of a continuously variable transmission (CVT) 10 which transfers drive between the vehicle's driveline 8 and a flywheel 9 is effectively extended by the use of an integrated starter-generator (ISG) 13 connected to the flywheel shaft 12. When there is a high mismatch of rotational speed between the propshaft 8 and the flywheel shaft 12, prior to connecting the two shafts by a clutch 11, the ISG 13 either spins up or decelerates the flywheel 9 until its speed is brought within the optimum operating range of the CVT 10. This measure reduces wear and tear on the clutch 11.

6 Claims, 1 Drawing Sheet

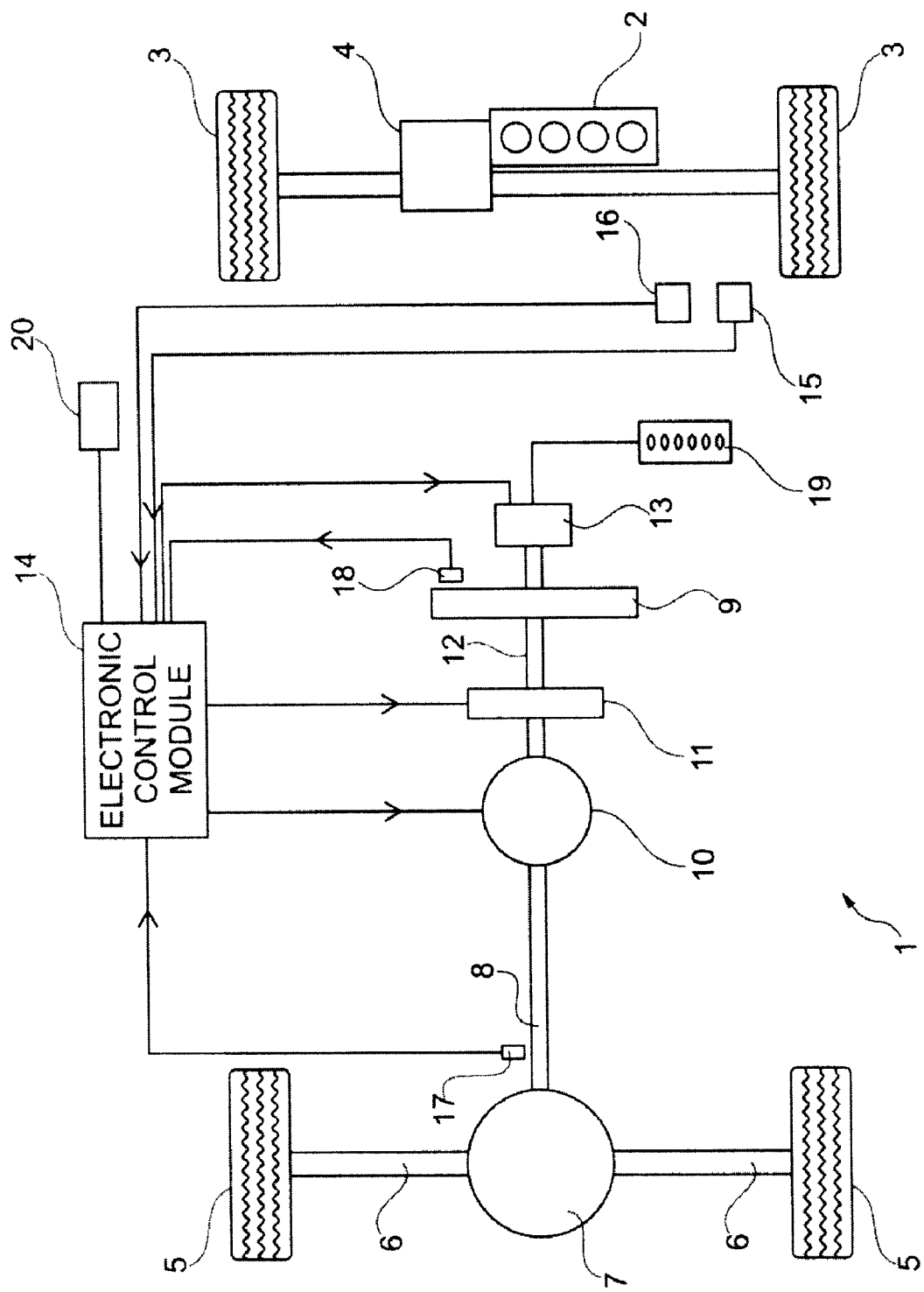

FLYWHEEL DRIVELINE AND CONTROL ARRANGEMENT

BACKGROUND OF THE INVENTION

This invention relates to a flywheel driveline and control arrangement, suitable for use as part of an energy storage and recovery system such as may be incorporated in a hybrid vehicle.

In a high-speed flywheel-based energy storage and recovery system, the flywheel is connected to the transmission of the vehicle via a continuously variable transmission (CVT) and manipulation of the CVT ratio achieves control of energy storage and recovery. See, for example, SAE technical paper 2008-01-0083, Apr. 14-17, 2008.

When the ratio is set so as to speed up the flywheel, energy is stored and when the ratio is set so as to slow down the flywheel, energy is recovered.

The key advantage of a flywheel hybrid vehicle is the magnitude of the power that can be transmitted between the flywheel and the vehicle wheels. A road car is capable of very high power transfer during braking and the key to hybrid system effectiveness is capturing as much of this normally wasted energy as possible. This is achieved by the careful matching of the flywheel rotational speed to that of the vehicle. The rotational speed of a high-speed flywheel varies approximately between zero and 60,000 RPM, whereas the vehicle's speed varies from zero to over 160 kph. There are two extremes of real-world operating conditions. The first is when the flywheel has zero speed and when the vehicle's speed is maximum. The second is when the flywheel is at its maximum speed and when the vehicle's speed is zero. To match these extreme conditions, ideally an infinitely variable transmission is required, or alternatively a CVT transmission used in conjunction with at least one clutch. The second option is perhaps more pragmatic as CVT's are a known and mass-produced transmission. Unfortunately, a CVT has a finite ratio range of typically six. This ratio range is inadequate to cover the entire operating spectrum of flywheel and vehicle speed, even with appropriately selected interim gear ratio sets. Consequently, the interim gear sets are usually optimized for a given goal such as maximizing fuel consumption savings on a defined drive cycle. However, this is likely to compromise fuel consumption savings at other operating conditions, especially those outside the boundaries of the defined drive cycle.

As described in Applicant's co-pending Application GB0816109.3, selectable multiple gear sets can be incorporated within the transmission between the flywheel and the vehicle wheels. The inclusion of one or more additional selectable gear sets beneficially broadens the operating window of the energy storage and recovery system. However, even with these additional multiple gear sets it is not possible to transfer power between the flywheel and the vehicle's wheels under the extremes of operating conditions. This limits the potential for fuel consumption savings. As it is not possible for the CVT transmission system to always match the vehicle and flywheel speeds, a clutch, interposed between the CVT and the flywheel is generally deployed to dynamically bridge the speed difference.

In conditions when the flywheel is at maximum speed and the vehicle is close to stationary, a substantial amount of energy (~400 kJ) needs to be dissipated through the clutch. At the other extreme condition, when the flywheel is at zero speed and the vehicle speed is close to maximum, a considerable but lesser amount of energy (~100 kJ) needs to be dissipated through the clutch to bridge the speed difference. These conditions represent wastage of energy and can lead to premature wear of the clutch itself.

This invention aims to mitigate the aforementioned problems.

SUMMARY OF THE INVENTION

According to the present invention, a flywheel driveline and control arrangement for a hybrid vehicle includes, a rotatable flywheel, an energy conversion device operably connected with the flywheel and capable of accelerating and decelerating the flywheel, a continuously variable transmission having an operating ratio range and being connectable with a driveline of the hybrid vehicle, a clutch for connecting and disconnecting the continuously variable transmission to and from the flywheel, an electronic control module for generating a control signal for said energy conversion device, wherein, in response to said control signal, the energy conversion device either accelerates the flywheel or decelerates the flywheel in order to bring the flywheel's rotational speed within the operating range of the continuously variable transmission.

The energy conversion device serves to bridge the speed difference between the vehicle and flywheel driveshafts which otherwise would have been done by clutch slippage. The use of an energy conversion device to control flywheel speed under certain vehicle operating conditions, permits a flywheel-based energy storage and recovery system to operate in a more efficient manner. The invention extends the operating window of the high-speed flywheel based energy storage and recovery system.

Specifically, at the extreme ends of the operational spectrum, as described above, (where there is a large difference between the speed of the vehicle's driveline and flywheel's speed), the flywheel's speed can be adjusted in order to match it more closely to the rotational speed of the vehicle's driveline. This can be done before closing the clutch and consequently permitting the transfer of torque between the vehicle's driveline and the flywheel via the CVT. As the rotational speed differential between the driveline and shaft is much reduced, the clutch can be closed with the minimum of slip, resulting in less wear and tear of this component.

The invention may further include an energy storage device connected to the energy conversion device.

The clutch may be an electro-hydraulic clutch and controlled by the electronic control module.

The energy conversion device may be an electric machine capable of utilising electrical power to rotate the flywheel and also capable of utilising the flywheel's rotational kinetic energy to generate electrical power. Such an electric machine is commonly referred to as an "integrated starter-generator" (ISG) or "combined starter-alternator" or "combined alternator-starter." Two types of ISG are in common use and either type can be utilised in this invention. In one configuration, the ISG and flywheel are connected to the same driveshaft and in the alternative configuration the ISG is connected via a belt and pulley arrangement to the flywheel's driveshaft. Alternatively, it is possible to integrate an ISG with or within a flywheel assembly. When operating in "starter" mode, the ISG may, conveniently, draw its electrical power from the vehicle's battery. It does this when it is instructed, (by the electronic control module) to spin up the flywheel. When it is instructed to decelerate the flywheel, the ISG operates in "generator" mode and may, conveniently, output the electrical current which it generates to the battery for storage of electrical charge for subsequent use in spinning up the flywheel and/or powering the vehicle's auxiliary electrical equipment. So rather than dissipating energy (as frictional heat) in the clutch in order to slow down the flywheel, the ISG permits storage of the energy which has been removed from the rotating flywheel. In an alternative embodiment, the energy conversion device is a hydraulic machine having a pump and motor dual functionality. Energy removed from a decelerating flywheel by the pumping action of the hydraulic machine may be stored in a hydraulic accumulator. This stored energy may be released at a later time in order to power the motor function of the hydraulic machine thereby to spin up the flywheel.

BRIEF DESCRIPTION OF THE DRAWINGS

Some embodiments of the invention will now be described, by way of example only, with reference to the drawing which is a schematic block diagram of a vehicle having a flywheel driveline in accordance with a first embodiment of the invention.

DETAILED DESCRIPTION OF THE PREFERRED EMBODIMENTS

With reference to the drawing, a vehicle 1 is equipped with an internal combustion engine 2 which provides motive power solely to a first set of wheels 3 through a gearbox and final drive assembly 4. A second set of wheels 5 is connected via half shafts 6 and a final drive and differential unit 7 to a propshaft 8. The propshaft can drive and be driven by a flywheel 9. Interposed between the propshaft 8 and flywheel 9 is a continuously variable transmission unit (CVT) 10 having a continuously variable gear ratio. An electro-hydraulic clutch 11 is provided for coupling and decoupling the CVT 10 (and consequently the wheels 5) to and from the flywheel 9 under certain operating conditions. A pressurised supply of oil is supplied to the CVT 10 by an oil pump (not shown) which is driven by the propshaft 8. The flywheel 9 is mounted on a driveshaft 12 to which is also connected an integrated starter-generator (ISG) 13.

An electronic control module ECM 14 receives inputs from an accelerator pedal position sensor 15, brake pedal position sensor 16, a propshaft speed sensor 17, and a speed sensor 18 associated with the flywheel. Output connections from the electronic control module 14 are made to the CVT 10, the clutch 11 and the ISG 13. A battery 19 is electrically connected to the ISG 13.

The CVT 10 can be of conventional design whose ratio can be varied in a known manner by operation of solenoid valves (not shown) which control the oil flow. Activation of the valves is under the control of the ECM 14. Conveniently, the CVT 10 can be of the steel belt variator type and having a ratio spread of typically six.

Some exemplary modes of operation of the illustrated embodiment will now be described.

In a first mode, with the vehicle running at a steady, comparatively low speed with light pressure on the accelerator pedal and the clutch 11 held open, no drive is transmitted from the second set of wheels 5 to the driveshaft 12 and so the flywheel 9 will remain stationary. However, oil pressure will be supplied to the CVT 10 by the pump which is being driven by the propshaft 8. No electrical current is being taken from or fed to the battery 19 by the ISG 13 at this stage. When the driver releases the accelerator pedal or depresses the brake pedal (in order to decelerate the vehicle 1), this is detected by the sensors 15, 16 and relayed to the electronic control module 14. In this first mode, the speed difference between the propshaft 8 and the flywheel driveshaft 12 is within the ratio range of the CVT 10. This is known by the ECM 14 which continuously monitors the outputs of the propshaft and flywheel speed sensors 17, 18. The ECM 14 calculates the CVT ratio required in order to accelerate the flywheel and generates a control signal in order to hydraulically control the CVT 10 so that the ratio is set to the calculated value. It also outputs a second control signal which causes the clutch 11 to close. Hence energy is transferred from the second set of wheels 5 to the flywheel 9. The action of energy transference into the flywheel causes the vehicle to decelerate. When the driver no longer wishes to decelerate and lifts his foot off the brake pedal, for example, the ECM 14 detects this and in response, it opens the clutch 11 and the flywheel 9 continues to spin freely. This energy is stored in the flywheel for future use. For example, the electronic control module 14 can send a signal to the ISG 13 causing the latter to act as a generator and convert the flywheel's rotational energy into an electric current to feed to the battery 19 for storage. Alternatively, when the electronic control unit 14 detects an acceleration demand (via the accelerator pedal position sensor 15) and that the speed difference between propshaft 8 and driveshaft 12 is within the range of the CVT 10, it re-sets the CVT 10 ratio to a new (calculated) value and closes the clutch 11 so that energy from the flywheel 9 is now used to drive the second set of wheels 5 thus assisting the engine 2 in propelling the vehicle.

In a second mode of operation in a first extreme operating condition, the flywheel has zero speed and the vehicle's speed is high, say 150 kph. (The clutch 11 is initially open). There is, consequently, a large difference between the propshaft 8 speed and the speed of the flywheel driveshaft 12 (zero). This mode is outside the operating ratio range of the CVT 10. The ECM 14 is aware that this large speed difference exists by virtue of the outputs from the speed sensors 17 and 18. In response, the ECM 14 calculates a rotational speed to which the flywheel 9 needs to be accelerated in order to bring the speed difference within the operating range of the CVT 10. It also calculates and sets a CVT ratio appropriate for permitting energy transfer from the propshaft 8 to the flywheel 9. The ECM 14 subsequently sends a signal to the ISG 13 which puts the latter in "starter" mode, whereby it draws current from the battery 19 in order to crank the flywheel driveshaft 12. When the flywheel 9 (and its driveshaft 12) have reached the calculated rotational speed (monitored by the sensor 18), the ECM 14 then instructs the ISG 13 to cease drawing the current. Accelerating the flywheel 9 in this way will consume a certain amount of energy. However, this energy outlay can be regarded as a high-return investment as now the substantial energy available from any deceleration from this (high) vehicle speed can be captured, as the flywheel is now operating within the operating range of the CVT 10. So when the ECM 14 subsequently detects a deceleration demand, it closes the clutch 11 so that energy can be transferred from the propshaft 8 to the flywheel 9.

In a third mode of operation in a second extreme operating condition, the flywheel is at its maximum speed and the vehicle is close to stationary, say 10 kph. (The clutch 11 is initially open). There is, consequently, a large difference between the propshaft 8 speed and the speed of the flywheel driveshaft 12. This mode is also outside the operating ratio range of the CVT 10. The ECM 14 is aware that this large speed difference exists by virtue of the outputs from the speed sensors 17 and 18. In response, the ECM 14 calculates a rotational speed to which the flywheel 9 needs to be decelerated in order to bring the speed difference within the operating range of the CVT 10. It also calculates an appropriate CVT ratio for permitting energy transfer from the flywheel 9 to the propshaft 8. The ECM 14 subsequently sends a signal to the ISG 13 which puts the latter in "generator" mode, whereby it sinks current to the battery 19. As a consequence, energy is drained from the flywheel 9 and it starts to slow down. When the flywheel 9 (and its driveshaft 12) have reached the calculated rotational speed (monitored by the sensor 18), the ECM 14 then instructs the ISG 13 to cease sinking current. This action of the ISG 13 recovers a substantial amount of energy and simultaneously brings the flywheel 9 into the operating region of the CVT 10. The ECM 14 can now close the clutch 11 on detecting a demand for vehicle acceleration. Subsequently, energy is transferred from the flywheel 9 to the propshaft 8 for supplementing engine power for propelling the vehicle.

In an alternative embodiment, the ISG 13 is replaced by a hydraulic machine in the form of an integrated hydraulic pump-motor unit, and the battery 19 is replaced by a hydraulic accumulator and associated reservoir. The hydraulic machine is coupled to the flywheel driveshaft 12. Such a hydraulic machine is the hydraulic equivalent of the electric integrated starter generator and is capable of extracting energy from and adding energy to the flywheel. The accumulator acts to store and release energy. The hydraulic machine is under the control of the ECM 14. While energy is being taken from the flywheel 9 (in order to decelerate it), the hydraulic machine, being driven by the driveshaft 12, is instructed by the ECM 14 to pump hydraulic fluid from the reservoir into the accumulator. While energy is being added to the flywheel 9 (in order to spin it up) the hydraulic machine is instructed by the ECM 14 to act as a motor, using the hydraulic energy stored in the accumulator to crank the driveshaft 12 and so accelerate the flywheel. If desired, the pumping function of the hydraulic machine can be utilised for generating high oil pressure for operation of the CVT 10.

In a modified embodiment, the vehicle 1 is fitted with a cruise control system 20 which has an output connected to the ECM 14. This output serves to notify the ECM 14 that the driver has made a request for vehicle acceleration or deceleration by means of the onboard cruise control switches (not shown) rather than by operating the accelerator or brake pedal.

In another embodiment, the ratio range of the CVT 10 can be extended still further by locating a gear set between the differential 7 and the CVT 10. Such a gear set can allow selection of one of several fixed ratios, selection being under the control of the ECM 14. For example, for a CVT ratio range of 6, appropriate selectable gear ratios would be 1:1, 90% of 6 and 90% of 36. This allows a 10% overlap between each gear selection for optimised performance.

In a further embodiment, to further assist in matching flywheel and propshaft speeds, an epicyclic reduction gear can be located between the CVT 10 and the flywheel 9.

In another embodiment, an additional electro-hydraulic clutch is located between the differential 7 and the CVT 10. This additional clutch is also controlled by the ECM 14. It permits decoupling of the CVT 10 from the wheels 5 in circumstances when there is no need for any energy transfer between the flywheel 9 and wheels 5. If the propshaft 8 is not driving the CVT 10, then fictional losses are minimised.

While the specific embodiment illustrated in the drawing shows a vehicle having one set of wheels being driven by an internal combustion engine and another set of wheels capable of being coupled to the flywheel, other configurations can also benefit from the invention. For example, the invention can be incorporated in a vehicle where the engine and flywheel drive the same axle. Further, the invention can be incorporated in a hybrid vehicle where the prime mover is an electric motor.

We claim:

1. A flywheel driveline and control arrangement for a hybrid vehicle including,
   a rotatable flywheel,
   an energy conversion device operably connected with the flywheel and capable of accelerating and decelerating the flywheel,
   a continuously variable transmission having an operating ratio range and being connectable with a driveline of the hybrid vehicle,
   a clutch for connecting and disconnecting the continuously variable transmission to and from the flywheel,
   an electronic control module for generating a control signal for said energy conversion device,
   wherein, in response to said control signal, the energy conversion device either accelerates the flywheel or decelerates the flywheel in order to bring the flywheel's rotational speed within the operating range of the continuously variable transmission.

2. A flywheel drive line and control arrangement as claimed in claim 1 and further including an energy storage device connected to the energy conversion device.

3. A flywheel driveline and control arrangement as claimed in claim 1 in which the energy conversion device is an electric starter-generator.

4. A flywheel driveline and control arrangement as claimed in claim 1 which the energy conversion device is a hydraulic pump-motor.

5. A flywheel driveline and control arrangement as claimed in claim 1 in which the clutch is an electro-hydraulic clutch.

6. A hybrid vehicle incorporating the flywheel driveline and control arrangement as claimed in claim 1.

* * * * *